US011303512B1

(12) United States Patent
Grimes et al.

(10) Patent No.: US 11,303,512 B1
(45) Date of Patent: Apr. 12, 2022

(54) PLATFORM FOR ESTABLISHING COMPUTING NODE CLUSTERS IN DIFFERENT ENVIRONMENTS

(71) Applicant: Capital One Services, LLC, McLean, VA (US)

(72) Inventors: Thomas Grimes, Arlington, VA (US); Patrick Litten, Boston, MA (US); Aarthi Sankaran, McLean, VA (US); Indulekha Ghandikota, Herndon, VA (US); Kenneth Wydler, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/162,858

(22) Filed: Jan. 29, 2021

(51) Int. Cl.
*G06F 15/177* (2006.01)
*H04L 41/0806* (2022.01)
*H04L 41/0654* (2022.01)
*H04L 43/0823* (2022.01)

(52) U.S. Cl.
CPC ...... *H04L 41/0806* (2013.01); *H04L 41/0654* (2013.01); *H04L 43/0823* (2013.01)

(58) Field of Classification Search
CPC ............. H04L 41/0806; H04L 41/0654; H04L 41/0823
See application file for complete search history.

(56) References Cited

U.S. PATENT DOCUMENTS

| 11,134,013 B1 * | 9/2021 | Allen ................. H04L 41/0806 |
| 11,195,023 B2 * | 12/2021 | Lloyd, II ............ G06K 9/00744 |
| 11,196,614 B2 * | 12/2021 | Mortensen .......... H04L 41/0636 |
| 2013/0227558 A1 * | 8/2013 | Du ........................ H04L 67/18 718/1 |
| 2016/0127206 A1 * | 5/2016 | Du ...................... G06F 9/45558 709/224 |
| 2021/0117425 A1 * | 4/2021 | Rao .................... H04L 41/0806 |

FOREIGN PATENT DOCUMENTS

| GB | 2552357 A | 1/2018 |
| WO | WO 2021/222991 A1 * | 11/2021 |

OTHER PUBLICATIONS

Goel; "What Is Amazon Elastic MapReduce (EMR)? Briefly Explained."; Mar. 26, 2020; 6 pages (Year: 2020).*

* cited by examiner

*Primary Examiner* — Richard G Keehn
(74) *Attorney, Agent, or Firm* — Harrity & Harrity, LLP

(57) ABSTRACT

In some implementations, a device may obtain a first set of information for establishing a computing node cluster that is applicable to multiple environments. The device may receive, from a client device, an indication of a second set of information for establishing the computing node cluster, wherein the second set of information is associated with a user of the client device and an environment associated with the user. The device may compile a third set of information for establishing the computing node cluster based on the first set of information and the second set of information. The device may transmit, to a server device, an indication of the third set of information to cause the server device to establish the computing node cluster. The device may monitor the computing node cluster using one or more monitoring techniques to determine a status of the computing node cluster.

20 Claims, 7 Drawing Sheets

PLATFORM FOR ESTABLISHING COMPUTING NODE CLUSTERS IN DIFFERENT ENVIRONMENTS

BACKGROUND

An open-source cluster computing framework, such as Elastic MapReduce (EMR), may provide batch processing and stream processing of jobs. The cluster computing framework provides application programming interfaces (APIs) that allow cluster devices to execute jobs (e.g., machine learning and/or structured query language (SQL)) that require fast and iterative access to datasets. The cluster computing framework may include computing node clusters, and each computing node cluster may include a master device (e.g., a master node), a driver device (e.g., a driver node or a core node), and one or more executor devices (e.g., executor nodes or task nodes). The master device receives jobs from client devices (e.g., via scripts that submit the jobs to the master device) and schedules the jobs for execution. When a job is scheduled to be executed, the master device provides the job to the driver device. The driver device divides the job into multiple tasks and provides the tasks to the executor devices for execution.

SUMMARY

In some implementations, a system for providing a common platform for establishing elastic MapReduce (EMR) clusters in different environments includes one or more memories and one or more processors, communicatively coupled to the one or more memories, configured to: obtain a specific configuration file that indicates one or more specific parameters for establishing an EMR cluster, wherein the EMR cluster is a cluster of virtual computing nodes in a cloud computing environment, and wherein the one or more specific parameters are provided by a client device and are associated with an environment in which the EMR cluster is to be applied; obtain a common configuration file that indicates one or more common parameters for establishing the EMR cluster, wherein the one or more common parameters are associated with multiple environments; communicate, with a cloud service system that provides the EMR cluster, a cluster configuration to establish the EMR cluster that is based on the specific configuration file and the common configuration file; and monitor the EMR cluster to determine at least one of whether the EMR cluster has been successfully established or run time information associated with the EMR cluster.

In some implementations, a method of establishing computing node clusters in different environments includes obtaining, by a device, a first set of information for establishing a computing node cluster, wherein the first set of information is applicable to multiple environments; receiving, by the device and from a client device, an indication of a second set of information for establishing the computing node cluster, wherein the second set of information is associated with a user of the client device and an environment associated with the user; compiling, by the device, a third set of information for establishing the computing node cluster based on the first set of information and the second set of information; transmitting, by the device and to a server device, an indication of the third set of information to cause the server device to establish the computing node cluster; and monitoring, by the device, the computing node cluster using one or more monitoring techniques to determine a status of the computing node cluster.

In some implementations, a non-transitory computer-readable medium storing a set of instructions includes one or more instructions that, when executed by one or more processors of a device, cause the device to: obtain a first configuration file for establishing a node cluster, wherein the first configuration file indicates one or more common parameters that are applicable to multiple environments; receive an indication of a second configuration file for establishing the node cluster, wherein the second configuration file indicates one or more specific parameters that are associated with an environment that is to be associated with the node cluster; generate a third configuration file for establishing the node cluster based on the first configuration and the second configuration file; transmit, to a cloud based server device, an indication of the third configuration file to cause the cloud based server device to establish the node cluster; monitor the node cluster using one or more monitoring techniques to determine a status of the node cluster; and perform an action if the status of the node cluster indicates a failure, wherein the action includes at least one of: transmitting, to a client device indicated by the second configuration file, an indication of the failure, or communicating, with the cloud based server device, to resolve the failure.

DETAILED DESCRIPTION

Figure 1A:
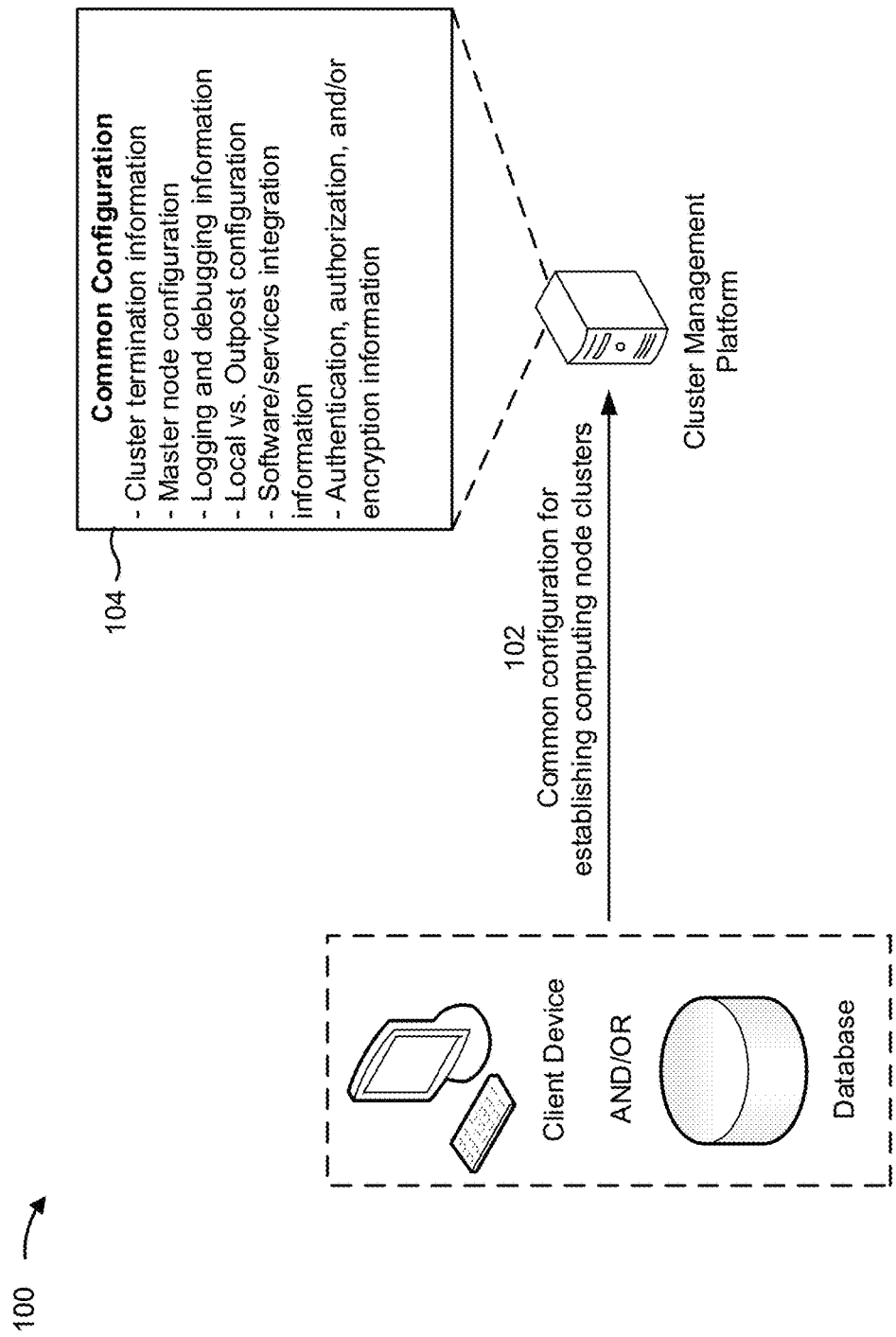
FIGS. 1A-1D are diagrams of an example implementation relating to a platform for establishing computing node clusters in different environments.

The following detailed description of example implementations refers to the accompanying drawings. The same reference numbers in different drawings may identify the same or similar elements.

In some cases, an entity may obtain (e.g., receive and/or generate) large data sets (e.g., "big data"). The big data obtained by the entity may be so voluminous and complex that traditional data processing applications cannot be used and/or that the big data cannot be processed objectively by a human actor. For example, the big data may be associated with hundreds, thousands, and/or millions of users and/or devices that generate thousands, millions, and/or billions, of data points. The entity may use big data processing. Big data processing may include a set of techniques or programming models to access large scale data to extract useful information for supporting and providing decisions. For example, big data processing may include machine learning, batch processing, distributed processing, and/or massive parallel processing, among other examples.

One big data processing technique is a cluster computing framework, such as APACHE SPARK and/or Elastic MapReduce (EMR). The cluster computing framework may use a HADOOP framework (e.g., a distributed computing model for processing big data). A HADOOP framework is an open-source implementation of MapReduce. MapReduce uses a Map function and a Reduce function to process the big data distributed across multiple heterogeneous computing nodes. Rather than using one large computer to process and store the data, the HADOOP framework allows for clustering nodes together to analyze massive data sets in parallel. EMR may provide a cloud-based cluster platform to enable an entity to create custom computing node clusters (e.g., an EMR cluster or a HADOOP cluster) that can be used to process big data using the HADOOP framework.

To create a computing node cluster, an entity may need to provide a configuration (e.g., a configuration file) to the cloud service system or platform that provides the computing node cluster. The configuration file may include code (e.g., Java code or Javascript object notation (JSON) code) that identifies a configuration for the computing node cluster. The configuration may include a cluster size, a master node configuration, node types, security information, a geographic region, a cluster location, where and how to store data, and/or how to output results, among other examples. As a result, creating the configuration file may include significant overhead associated with coding, processing, and/or otherwise generating the configuration file. In some cases, an entity (e.g., a company or institution) may periodically create computing node clusters in this way for performing big data processing. Therefore, the entity may be required to continually consume resources (e.g., processing resources, network resources, and/or time resources) to generate and/or provide a configuration file to the cloud service system or platform (e.g., that provides the computing node cluster) each time the entity establishes a computing node cluster. Moreover, the entity may create computing node clusters in different environments (e.g., in different geographic regions, for different purposes, and/or with different configuration information). For example, the entity may be associated with different users or different teams that need to establish computing node clusters in different environments and/or for different purposes. The entity may be required to consume resources (e.g., processing resources, network resources, and/or time resources) to generate and/or provide a configuration file to the cloud service system or platform (e.g., that provides the computing node cluster) each time the entity establishes a computing node cluster in a different environment.

Some implementations described herein enable a common platform or system for establishing and/or managing computing node clusters in different environments. For example, the platform may enable a configuration file to be generated from a common configuration (e.g., common to environments or purposes) and a specific configuration (e.g., specific to an environment, purpose, and/or user/team). For example, a user may use a device (e.g., a client device) to communicate with the platform to establish a computing node cluster. The user may indicate, via the client device, a specific configuration that is to be associated with establishing the computing node cluster. The platform may obtain the specific configuration and a common configuration. The platform may create a configuration file based on the specific configuration and the common configuration (e.g., by merging the specific configuration and the common configuration). The platform may transmit, to a cloud service system that provides the computing node cluster, the configuration file to cause a computer node cluster to be established in accordance with the configuration file. As a result, the platform enables resources (e.g., computing resources and/ or time resources) to be conserved that would have otherwise been used to generate and/or provide a configuration file to the cloud service system or platform (e.g., that provides the computing node cluster) each time the entity establishes a computing node cluster in a different environment.

Moreover, as the platform provides a uniform platform that can be used across multiple environments, multiple teams, and/or multiple users, the platform may enable uniform monitoring of established computing node clusters. For example, after communicating with the cloud service system to cause the computer node cluster to be established, the platform may monitor the computer node cluster for failures. For example, the platform may ensure that the computing node cluster is successfully established and/or that only one (e.g., and not multiple) computer node cluster is established. Additionally, or alternatively, the platform may automatically establish a cluster status monitoring event to monitor the status of the computing node cluster. Additionally, or alternatively, the platform may automatically establish a run time monitor associated with the computing node cluster that monitors a use or computing activity level associated with the computing node cluster. As a result, the platform may identify a failure (e.g., a failure of the computing node cluster to establish, multiple computing node clusters being established, and/or an inactivity of the computing node cluster) and perform an action to mitigate the failure. For example, the platform may transmit an indication to a client device associated with a user that requested the computing node cluster to be established. Additionally, or alternatively, the platform may communicate with the cloud service system to address the failure. Because an entity may use the platform to establish all computing node clusters across the entity, the platform can ensure uniform monitoring of computing node clusters across different environments, different teams, and/or different users. The uniform monitoring may conserve resources (e.g., computing resources, processing resources, memory resources, and/or monetary resources) that would have otherwise been consumed by a failure of a computing node cluster being undetected or not addressed in a timely manner.

FIGS. 1A-1D are diagrams of an example 100 associated with a platform for establishing computing node clusters in different environments. As shown in FIGS. 1A-1D, example 100 includes a client device, a cluster management platform, a database, and a cloud service system. These devices are described in more detail in connection with FIGS. 2 and 3.

As shown in FIG. 1A, the cluster management platform may obtain information for establishing computing node clusters. A computing node cluster may be referred to herein as an EMR cluster, a node cluster, a HADOOP cluster, and/or a computing cluster, among other examples. The information may be configuration information that indicates one or more parameters that are to be used to establish a computing node cluster. For example, the computing node cluster may be provided and/or managed by a cloud service system or a cloud service provider. The cloud service system may be associated with an entity that provides on-demand cloud computing platforms on, for example, a metered pay-as-you-go basis.

As shown by reference number 102, the cluster management platform may obtain a common configuration for establishing computing node clusters. The common configuration may indicate configuration information or configuration parameters that can be applied to multiple users, multiple environments, and/or different purposes (e.g., on the computing node cluster), among other examples. The common configuration enables the cluster management platform to use, or re-use, the information indicated by the common configuration when establishing computing node clusters for different users and/or in different environments, as explained below in more detail.

In some implementations, the cluster management platform may receive the common configuration from the client device. For example, a user may input and/or update the common configuration via the client device. The user may provide the common configuration to the cluster management platform via the client device. In some implementations, the cluster management platform may obtain the common configuration from a database. For example, the cluster management platform (or another device, such as the client device) may store the common configuration in the database. The cluster management platform may obtain the common configuration by parsing or searching the database for the common configuration. For example, the cluster management platform may retrieve the common configuration from the database.

As shown by reference number 104, the common configuration may indicate information for one or more parameters associated with establishing computing node clusters. For example, the common configuration may indicate cluster termination information. Cluster termination information may indicate whether the computing node cluster is to run until the computing node cluster is manually terminated or whether the computing node cluster is to be associated with automatic termination (e.g., after a certain number or steps or tasks are completed and/or after a certain amount of time). In some implementations, the common configuration may indicate a master node configuration. The master node configuration may indicate a number of master nodes that are to be associated with a computing node cluster (e.g., one master node or multiple master nodes).

In some implementations, the common configuration may indicate logging and/or debugging information. The logging and/or debugging information may indicate how a computing node cluster is to write and/or store log files generated by the computing node cluster. Additionally, or alternatively, the logging and/or debugging information may indicate one or more types of log files to be generated by the computing node cluster, such as step logs, HADOOP component logs, bootstrap action logs, and/or instance state logs, among other examples. In some implementations, the common configuration may indicate whether computing node clusters are to use local zones or an outpost. A local zone may be a geographic region that indicates a location of computing, storage, and/or database infrastructure of the cloud service system (e.g., enabling the cloud service system to use physical infrastructure located closer to a client device to reduce latency, as described in more detail below). An outpost may be an on-premises platform that enables an entity to host an environment similar to a public cloud on premises.

In some implementations, the common configuration may indicate software and/or services integration information. For example, a computing node cluster may be established with a third-party application or service, such as a business intelligence tool. The software and/or services integration information may indicate whether computing node clusters are to be established with a third-party application and/or may indicate one or more third-party applications to be associated with computing node clusters (e.g., to be run when computing node clusters are established). In some implementations, the common configuration may indicate authentication, authorization, and/or encryption information. The authentication, authorization, and/or encryption information may indicate security information or security parameter(s) associated with establishing computing node clusters, such as a type of cryptography to be used (e.g., secret-key cryptography), one or more required permissions, and/or one or more security groups (e.g., virtual firewalls for computing node clusters), among other examples. In some implementations, the common configuration may indicate a computing node cluster hardware and networking configuration. The hardware and networking configuration may indicate a node configuration (e.g., a configuration for the instances or the hardware that host different node types).

Figure 1B:
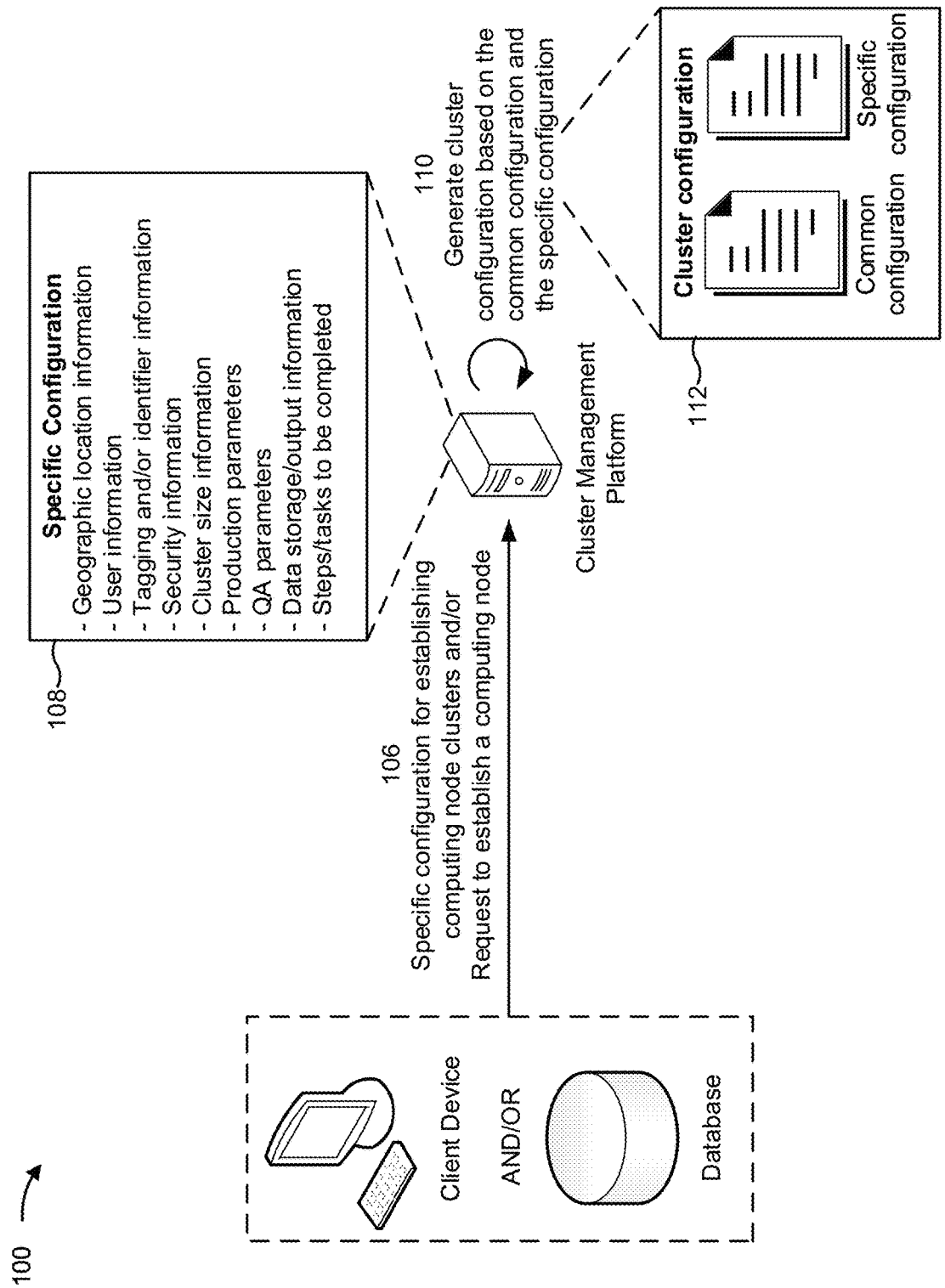

As shown in FIG. 1B, and by reference number 106, the cluster management platform may obtain a specific configuration for establishing computing node clusters. The specific configuration may indicate configuration information or configuration parameters that are associated with a specific user, a specific team of users, a specific environment, and/or a specific purpose (e.g., on the computing node cluster), among other examples. A specific configuration enables the cluster management platform to establish computing node clusters that are customized to the specific user, the specific team of users, the specific environment, and/or the specific purpose associated with the computing node cluster. For example, as described in more detail below, the cluster management platform is enabled to use the common configuration and a specific configuration to establish a computing node cluster.

In some implementations, the cluster management platform may receive the specific configuration from a client device. For example, a user may input and/or update the specific configuration via the client device. The user may provide the specific configuration to the cluster management platform via the client device. In some implementations, the cluster management platform may obtain the specific configuration from a database. For example, the cluster management platform (or another device, such as the client device) may store the specific configuration in the database. The cluster management platform may obtain the specific configuration by parsing or searching the database for the specific configuration (e.g., based on an identifier associated with a user and/or with the specific configuration). For example, the cluster management platform may retrieve the specific configuration from the database.

In some implementations, the cluster management platform may receive the specific configuration (and/or the common configuration) via an application programming interface (API) call, a command-line interface command, and/or via a command to initiate an anonymous function (e.g., a lambda function). For example, in some implementations, the cluster management platform may be stored by or may be included in the cloud service system (e.g., may be stored in or included in the cloud computing environment provided by the cloud service system). The cluster management platform may receive the specific configuration (and/or the common configuration) via an indication transmitted to the cloud service system.

In some implementations, the cluster management platform may receive the specific configuration with a request to establish a computing node cluster. For example, a user may transmit, to the cluster management platform and via the client device, a request to establish a computing node cluster and an indication of the specific configuration. In some implementations, the request to establish the computing node cluster may indicate a location (e.g., in the database) of the specific configuration and/or the common configuration.

As shown by reference number 108, the specific configuration may indicate information for one or more parameters associated with establishing computing node clusters. For example, the specific configuration may indicate geographic location information. The geographic location information may indicate a geographic location of the client device(s) that are to leverage the established computing node cluster to perform tasks or steps. As described above, the cloud service system may use computing infrastructure that is located in different geographic locations. Therefore, the geographic location information enables a computing node cluster to be established using computing infrastructure that is located near the location of the client device(s) that are to leverage the established computing node cluster to perform tasks or steps. This reduces latency associated with performing the tasks or steps using the established computing node cluster.

In some implementations, the specific configuration may indicate user information. The user information may indicate information related to with a user or a team of users that is associated with the specific configuration. For example, the user information may indicate user identifier information or contact information (e.g., an email address, a phone number, and/or another messaging platform address) for the user or the team that is associated with the specific configuration. The contact information may enable the cluster management platform to transmit an indication (e.g., to a device or address indicated by the contact information) of a detected failure of a computing node cluster, as described in more detail below.

In some implementations, the specific configuration may indicate tagging and/or identifier information. The tagging and/or identifier information may indicate one or more tags or one or more identifiers that are to be associated with tasks and/or steps performed using an established computing node cluster (e.g., to be included in a log generated by the computing node cluster). In some implementations, the tagging and/or identifier information may indicate a tag or an identifier to be associated with computing node clusters established based on the specific configuration. For example, the tagging and/or identifier information may indicate metadata that is to be associated with computing node clusters established based on the specific configuration.

In some implementations, the specific configuration may indicate security information or parameters. For example, some users or teams may have different levels of security than the level of security indicated by the common configuration. The security information of the specific configuration may indicate one or more required permissions and/or one or more security groups, among other examples, associated with the specific configuration.

In some implementations, the specific configuration may indicate cluster size information or a cluster size parameter. The cluster size information may indicate a number of nodes to be included in computing node clusters established based on the specific configuration. In some implementations, the cluster size information a number of nodes, for one or more types of node (e.g., master nodes, core nodes, and/or task nodes), to be included in computing node clusters established based on the specific configuration.

In some implementations, the specific configuration may indicate one or more production parameters. A production parameter may indicate information associated with a type of task or steps to be run using established computing node clusters, one or more third-party applications that are to be run on established computing node clusters, and/or one or more services that are to be associated with established computing node clusters. In some implementations, a production parameter may indicate one or more bootstrap actions to be associated with established computing node clusters. A bootstrap action may be an action to install software or customize a configuration of a cluster instance for an application to be run on the established computing node cluster. In some implementations, the specific configuration may indicate one or more quality assurance (QA) parameters. The one or more QA parameters may indicate information associated with logging or debugging, among other examples.

In some implementations, the specific configuration may indicate data storage and/or output information. The data storage and/or output information may indicate how and/or where an established computing node cluster is to store and output information or data generated by the established computing node cluster. For example, the data storage and/or output information may indicate a file system or file type to be used by established computing node clusters (e.g., a HADOOP distributed file system (HDFS), an EMR file system (EMRFS), and/or a local file system). In some implementations, the specific configuration may indicate a uniform resource identifier (URI) to be used to access data generated by computing node clusters. In some implementations, the data storage and/or output information may indicate a storage location for data generated by computing node clusters within a cloud computing environment provided by the cloud service system. In some implementations, the data storage and/or output information may be partially (or entirely) indicated by the common configuration.

In some implementations, the specific configuration may indicate one or more steps and/or one or more tasks to be completed by a computing node cluster established based on the specific configuration. A step may be a unit of work that contains instructions to manipulate data for processing by the computing node cluster. For example, a step may be to input a data set for processing, processing data using an indicated program or application, and/or generating an output data set, among other examples. In some implementations, the one or more steps and/or one or more tasks to be completed by a computing node cluster may be indicated in a request to establish a computing node cluster (e.g., rather than in the specific configuration).

As shown by reference number 110, the cluster management platform may generate a cluster configuration (e.g., information to be provided to the cloud service system to cause a computing node cluster to be established) based on the common configuration and the specific configuration. For example, as shown by reference number 112, the common configuration and the specific configuration may be files that contain code (e.g., JSON code or another type of code). The code may indicate the information for the common configuration and/or the specific configuration, as described above. The cluster management platform may merge the common configuration and the specific configuration to generate or compile the cluster configuration. For example, the cluster management platform may identify information from the specific configuration that is not included in the common configuration (e.g., geographic location information). Additionally, or alternatively, the cluster management platform may identify information in the specific configuration that is different than corresponding information in the common configuration (e.g., different security information). The cluster management platform may generate the cluster configuration to indicate information indicated by the common configuration, and information from the specific configuration that is not included in the common configuration and/or information in the specific configuration that is different than corresponding information in the common configuration. In the case that there is a conflict between information in the common configuration and information a specific configuration (e.g., the common configuration indicates a security parameter A and the specific configuration indicates a security parameter B), the information in the specific configuration should control for the cluster configuration (e.g., the cluster configuration indicates security parameter B, rather than security parameter A).

In some implementations, the cluster management platform may obtain a second specific configuration (e.g., that is associated with a different user, environment, and/or purpose as the specific configuration described above). The second specific configuration may indicate similar types of information as described above that is specific to the user, team, environment, and/or purpose associated with the second specific configuration. The cluster management platform may generate a second cluster configuration for the user, environment, and/or purpose associated with the second specific configuration based on the common configuration and the second specific configuration.

In this way, the cluster management platform may be enabled to generate a cluster configuration (e.g., a cluster configuration file) for a specific user, a specific team of users, a specific environment, and/or a specific purpose without requiring the information included in the common configuration to be provided or generated by the user requesting to establish a computing node cluster. Moreover, the cluster management platform may ensure that the cluster configuration is accurate and up to date by using the common configuration stored by the cluster management platform. For example, as described above, the user requesting to establish a computing node cluster is not required to generate the common configuration (and/or the specific configuration) each time the user requests that a computing node cluster be established. This reduces a likelihood of human error introduced by generating the common configuration (and/or the specific configuration) each time the user requests that a computing node cluster be established.

Moreover, as described above, the common configuration may be associated with an entity (e.g., a company) and a specific configuration may be associated with a user or a team associated with the entity (e.g., an employee or a team/or group within the company). Therefore, by using, or re-using, the common configuration, the cluster management platform ensures that the cluster configuration is uniform (e.g., for the information indicated by the common configuration) for computing node clusters established by any user or team associated with the entity. For example, if the entity changes or updates information indicated by the common configuration, the entity is only required to change or update the information once, rather than for each user or team associated with the entity. Moreover, the cluster management platform ensures that changes or updates to information indicated by the common configuration are immediately applied to any computing node cluster established by a user or team associated with the entity.

Figure 1C:
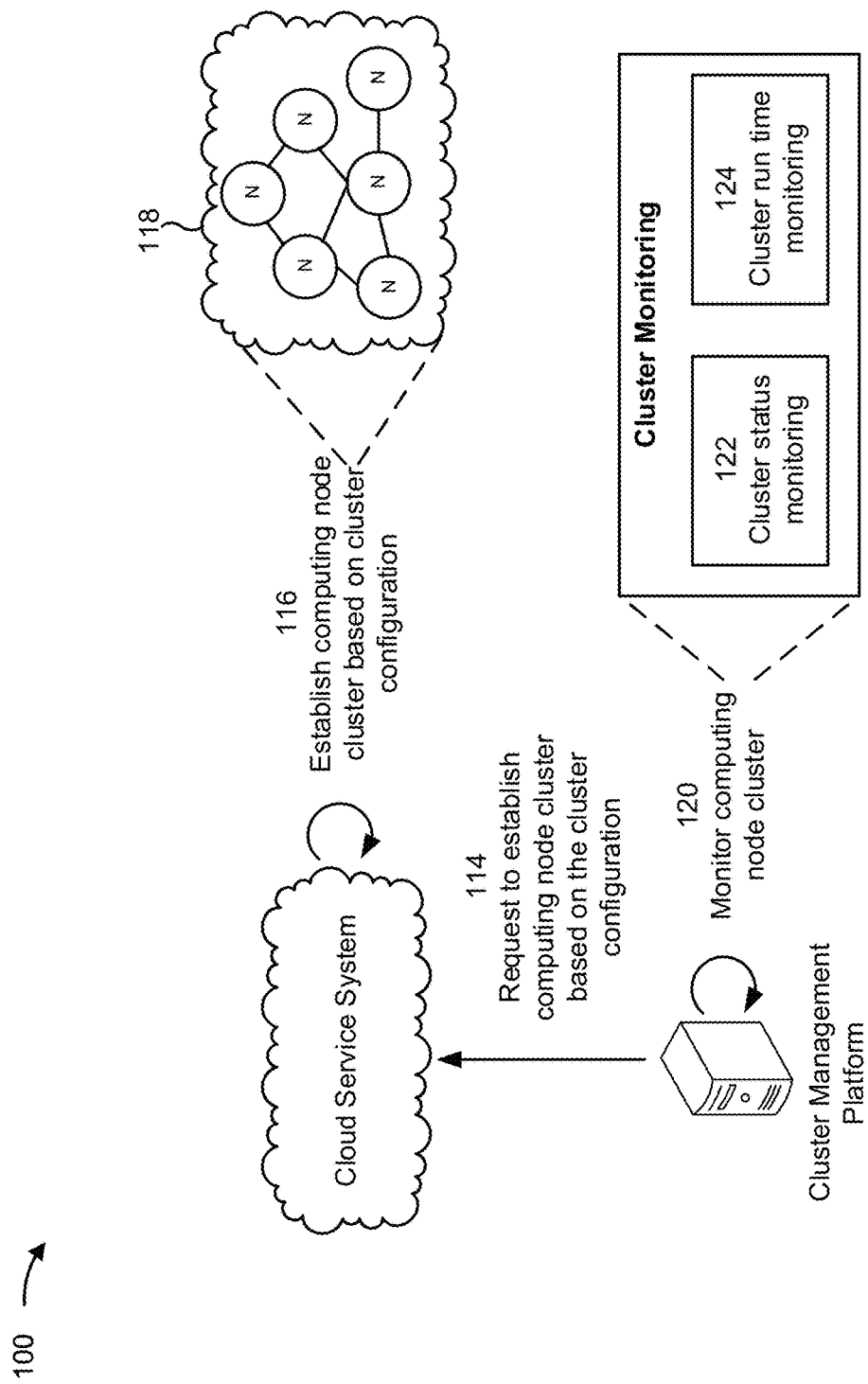

As shown in FIG. 1C, and by reference number 114, the cluster management platform may transmit, to the cloud service system, a request to establish a computing node cluster based on the cluster configuration (e.g., that is generated by the cluster management platform as described above). For example, the cluster management platform may receive, from a client device, a request to establish a computing node cluster. The cluster management platform may generate the cluster configuration based on receiving the request (e.g., by retrieving the common configuration and the specific configuration indicated by the request and generating the cluster configuration). The cluster management platform may transmit, to the cloud service system, the request to establish a computing node cluster based on receiving the request to establish a computing node cluster from the client device. In some implementations, the cluster management platform may transmit, to the cloud service system, the request to establish a computing node cluster based on a periodic schedule. The specific configuration and/or a request to establish computing node clusters may indicate the periodic schedule. For example, the periodic schedule may indicate that the cluster management platform is to establish a computing node cluster, based on the cluster configuration, once per day, once per week, and/or once per day on weekdays (e.g., Monday through Friday, but not on Saturday or Sunday). In some implementations, the periodic schedule may indicate a time that the cluster management platform is to establish a computing node cluster.

As shown by reference number 116, the cloud service system may establish a computing node cluster based on the cluster configuration. For example, the cloud service system may receive the cluster configuration from the cluster management platform and may establish a computing node cluster in accordance with the cluster configuration. As shown by reference number 118, the computing node cluster may include one or more connected computing nodes. A computing node may be a server device, a virtual server device, a virtual machine, and/or a cloud-based computing device, among other examples. The computing node cluster may include one or more master nodes (e.g., that manage the computing node cluster and run master components of distributed applications across the computing node cluster), one or more core nodes (e.g., that are managed by the master nodes and perform data node tasks to coordinate data storage and/or other tasks to perform parallel computation tasks on data), and/or one or more task nodes (e.g., that provide additional computing resources for performing parallel computation tasks on data). In some implementations, task nodes may be optional and may not be included in the computing node cluster.

As shown by reference number 120, the cluster management platform may monitor the computing node cluster. For example, the cluster management platform may monitor the computing node cluster based on transmitting the request to establish a computing node cluster. The cluster management platform may monitor the computing node cluster using one or more monitoring techniques described herein. The cluster management platform may establish one or more monitoring events or monitoring tasks. The cluster management platform may monitor the computing node cluster to detect a failure associated with the computing node cluster, as described below in more detail.

As shown by reference number 122, monitoring the computing node cluster may include cluster status monitoring. Cluster status monitoring may include the cluster management platform establishing a cluster monitoring event, such as CloudWatch event. Cluster status monitoring may enable the cluster management platform to identify and/or detect one or more failures associated with the computing node cluster, such as a failure to be successfully established, a failure associated with the cloud service system establishing multiple computing node clusters (e.g., rather than a single computer node cluster as requested), a failure or termination after being established, and/or a failure of the computing node cluster to successfully complete one or more steps or tasks, among other examples.

As shown by reference number 124, monitoring the computing node cluster may include cluster run time monitoring. Cluster run time monitoring may include the cluster management platform establishing a run time monitor associated with the computing node cluster. The run time monitor may track an activity level (e.g., a computing activity level) associated with the computing node cluster. For example, the run time monitor may track steps or tasks completed using the computing node cluster. The run time monitor may enable the cluster management platform to identify and/or detect one or more failures associated with the computing node cluster, such as a failure associated with an idle or inactive computing node cluster. For example, the run time monitor may detect when a computing node cluster has been established and is actively running, but no steps or tasks have been provided to or run using the computing node cluster for an amount of time (e.g., indicating that the computing node cluster is running, but is idle or inactive). This enables the cluster management platform to automatically terminate an idle computing node cluster and/or immediately indicate to a user associated with the computing node cluster that the computing node cluster is idle. As described above, the cloud service system may be a pay-as-you go platform. Therefore, an idle computing node cluster may incur significant costs to the entity or user without incurring any benefit (e.g., of performing steps or tasks).

Figure 1D:
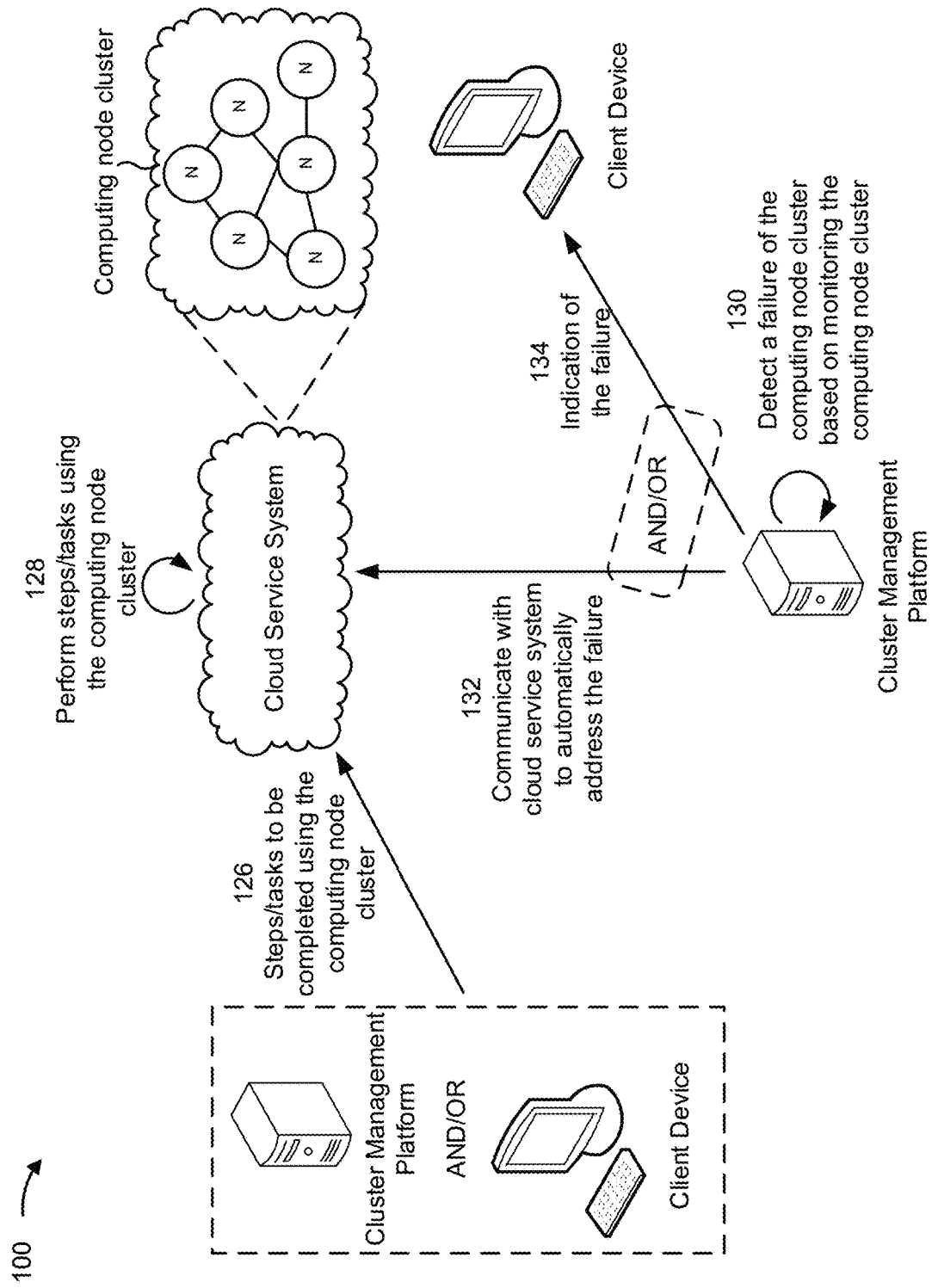

As shown in FIG. 1D, and by reference number 126, one or more steps or tasks to be completed using the computing node cluster may be provided to the cloud service system. For example, a step file, that indicates the one or more steps or tasks to be completed using the computing node cluster, may be provided to the cloud service system. In some implementations, the cluster management platform may provide the one or more steps or tasks to be completed using the computing node cluster to the cloud service system. In some implementations, a client device may provide the one or more steps or tasks to be completed using the computing node cluster to the cloud service system (e.g., after the computing node cluster is established by the cluster management platform).

As shown by reference number 128, the cloud service system may perform the one or more steps or tasks using the computing node cluster. For example, the cloud service system may perform the one or more steps or tasks using one or more nodes included in the computing node cluster. In some implementations, the cloud service system may track whether the one or more steps or tasks have been successfully completed. For example, the cloud service system may track a status (e.g., pending, completed, and/or failed) of the one or more steps or tasks provided to the cloud service system.

As shown by reference number 130, the cluster management platform may detect or identify a failure of the computing node cluster based on monitoring the computing node cluster, as described above. As described above, a failure may include the computing node cluster failing to be successfully established, the computing node cluster terminating after being established, multiple computing node clusters being established, a step or task that is to be completed by the computing node cluster not being successfully completed, and/or the computing node cluster being idle for an amount of time, among other examples.

For example, in some cases, the cloud service system may fail to successfully establish the computing node cluster in accordance with the cluster configuration. Similarly, the computing node cluster may be terminated (e.g., be inadvertently terminated) after the computing node cluster is established. Moreover, in some cases, the cloud service system may establish multiple computing node clusters when only a single computing node cluster is requested. The cluster management platform may detect or identify these failures, or similar types of failures, based on establishing the cluster status monitoring, as described above.

In some cases, as described above, the computing node cluster may be idle (e.g., may not perform any steps or tasks) for an amount of time. The cluster management platform may detect or identify a failure of the computing node cluster based on the computing node cluster being idle for an amount of time (e.g., a threshold amount of time, such as 30 minutes, 1 hour, 3 hours, and/or 6 hours). The cluster management platform may detect or identify this failure based on establishing the run time monitor, as described above.

As shown by reference number 132, the cluster management platform may communicate with the cloud service system to automatically address a detected failure. For example, if a detected failure is that the computing node cluster failed to successfully establish and/or was termination after being successfully established, the cluster management platform may automatically retry to establish the computing node cluster. For example, the cluster management platform may transmit, to the cloud service system, a request to establish another computing node cluster based on the cluster configuration. If a detected failure is that multiple computing node clusters have been established when only a single computing node cluster was requested, then the cluster management platform may communicate with the cloud service system to automatically terminate all but one of the multiple computing node clusters.

If a detected failure is that a step or task to be completed using the computing node cluster has not been successfully completed (e.g., has failed), then then the cluster management platform may communicate with the cloud service system to automatically retry to perform the step or task that was not successfully completed. For example, the cluster management platform may communicate with the cloud service system to cause the cloud service system to attempt to perform the step or task (e.g., that was previously not successfully completed) using the computing node cluster. This improves a likelihood that steps or tasks to be performed using the computing node cluster are successfully completed. Moreover, the enables the cluster management platform to automatically retry the steps or tasks without requiring an indication from a client device (e.g., without requiring user intervention or user detection of the failed steps or tasks). As a result, the computing node cluster may conserve resources that would have otherwise been used associated with identifying, detecting and/or retrying the failed steps or tasks. Moreover, the computing node cluster may conserve resources (e.g., processing resources and/or monetary resource) that would have otherwise been used or lost associated with the failed steps or tasks.

In some implementations, based on detecting that a step or task to be completed using the computing node cluster has not been successfully completed (e.g., has failed), the cluster management platform may refrain from establishing another computing node cluster (e.g., following a periodic schedule of establishing computing node clusters, as described above). For example, in some cases, steps or tasks to be completed on a subsequent computing node cluster (e.g., the next day) may rely on steps or tasks to be successfully completed using a previous computing node cluster (e.g., from the previous day). If the steps or tasks to be completed using the previous computing node cluster are not successfully completed, then the steps or tasks to be completed using the subsequent computing node cluster may fail or may produce an inaccurate output. Therefore, the cluster management platform may refrain from establishing the subsequent computing node cluster to conserve resources that would have otherwise been used to establish the subsequent computing node cluster and/or to perform steps or tasks using the subsequent computing node cluster. For example, the cluster management platform may determine that the specific configuration indicates that the steps or tasks are to be completed prior to establishing the subsequent computing node cluster. The cluster management platform may refrain from establishing the subsequent computing node cluster until the cluster management platform identifies or detects that the steps or tasks have been successfully completed (or until the cluster management platform receives an indication from a client device to establish the subsequent computing node cluster).

If a detected failure is that the computing node cluster has been idle for an amount of time (e.g., for a threshold amount of time), then the cluster management platform may communicate with the cloud service system to terminate the computing node cluster. As described above, the cloud service system may provide computing node clusters as a pay-as-you-go platform. Therefore, an idle computing node cluster may incur significant costs associated with running the computing node cluster. The cluster management platform may communicate with the cloud service system to automatically terminate an idle computing node cluster, thereby conserving monetary resource and/or computing resources (e.g., of the cloud service system) that would have otherwise been used by the idle computing node cluster.

As shown by reference number 134, the cluster management platform may transmit, to a client device, an indication of a detected failure. As shown in FIG. 1D, the cluster management platform may transmit the indication of the detected failure in addition to, or as alternative to, communicating with the cloud service system to automatically address the detected failure. The cluster management platform may transmit the indication of the detected failure to a device or an address indicated by the specific configuration associated with the computing node cluster. For example, as described above, the specific configuration may indicate an identifier of a client device, an email address, a phone number, and/or another messaging platform address associated with the specific configuration. The cluster management platform may identify the device and/or address from the specific configuration and may transmit the indication of the detected failure to the device and/or address indicated by the specific configuration.

This enables a user associated with the client device to identify the detected failure immediately (or soon after) the failure has been detected by the cluster management platform. Therefore, the user may enabled to take one or more actions, via the client device and/or the cluster management platform, to address the detected failure, such as requesting that a step or task be retried, terminating the computing node cluster, and/or communicating with the cloud service system to address the detected failure.

As the cluster management platform provides a uniform platform that can be used across multiple environments, multiple teams, and/or multiple users, the cluster management platform may enable uniform monitoring of established computing node clusters, as described above. For example, the cluster management platform may ensure that each computing node cluster that is established via the cluster management platform is monitored as described above. This ensures uniform monitoring of computing node clusters across an entity that establishes computing node clusters in different environments, different locations, and/or for different purposes. As a result, the cluster management platform may identify or detect a failure and perform an action to mitigate the failure, as described above. Because an entity may use the cluster management platform to establish all computing node clusters across the entity, the cluster management platform can ensure uniform monitoring of computing node clusters across different environments, different teams, and/or different users. The uniform monitoring may conserve resources (e.g., computing resources, processing resources, memory resources, and/or monetary resources) that would have otherwise been consumed by a failure of a computing node cluster being undetected or not addressed in a timely manner.

As indicated above, FIGS. 1A-1D are provided as an example. Other examples may differ from what is described with regard to FIGS. 1A-1D.

Figure 2:
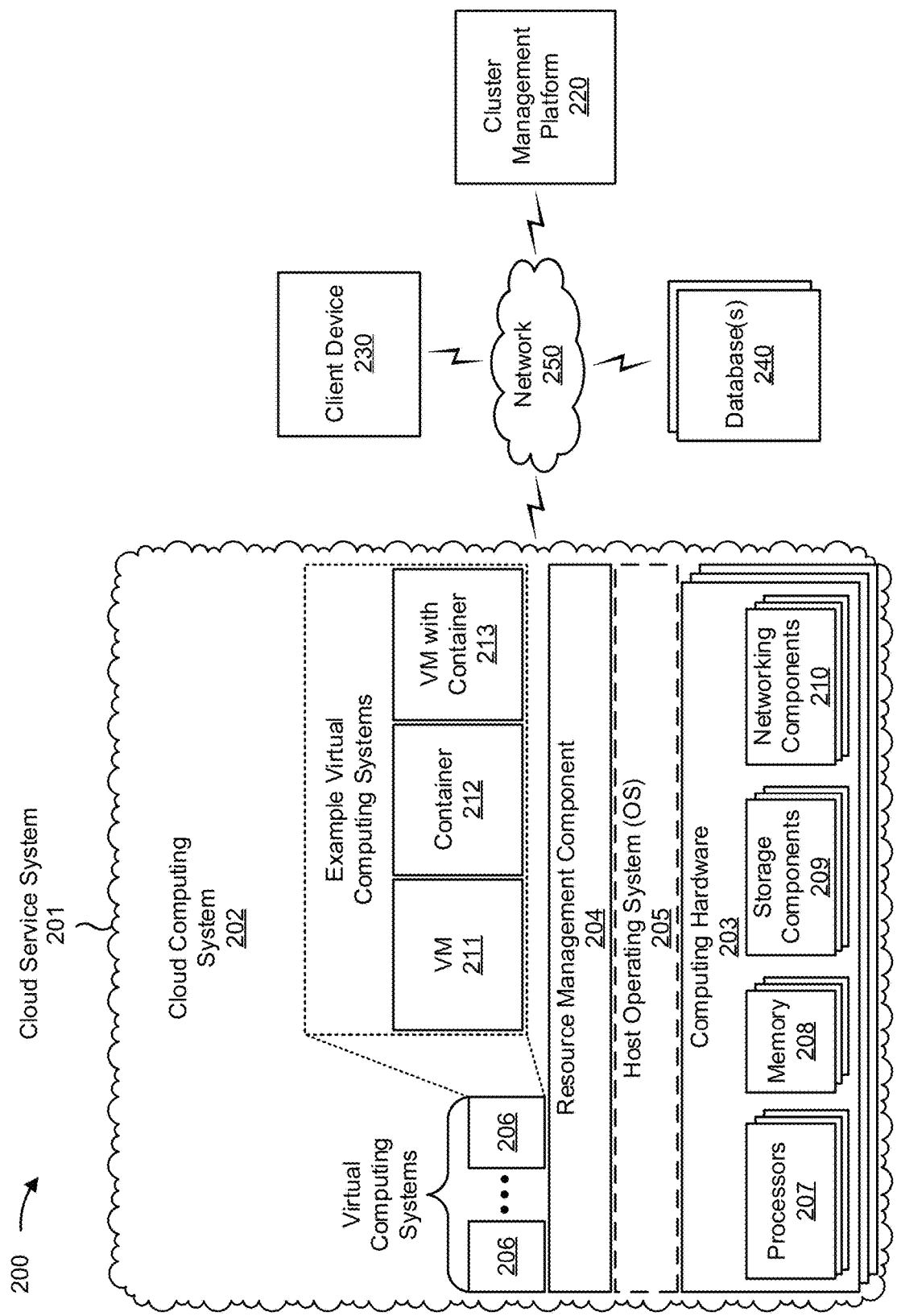
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a cloud service system 201, which may include one or more elements of and/or may execute within a cloud computing system 202. The cloud computing system 202 may include one or more elements 203-213, as described in more detail below. As further shown in FIG. 2, environment 200 may include a cluster management platform 220, a client device 230, one or more databases 240, and/or a network 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the cloud service system 201 may include one or more elements 203-213 of the cloud computing system 202, may execute within the cloud computing system 202, and/or may be hosted within the cloud computing system 202, in some implementations, the cloud service system 201 may not be cloud-based (e.g., may be implemented outside of a cloud computing system) or may be partially cloud-based. For example, the cloud service system 201 may include one or more devices that are not part of the cloud computing system 202, such as device 300 of FIG. 3, which may include a standalone server or another type of computing device. The cloud service system 201 may perform one or more operations and/or processes described in more detail elsewhere herein.

The cluster management platform 220 includes one or more devices capable of receiving, generating, storing, processing, providing, and/or routing information associated with establishing and/or monitoring computing node clusters (e.g., EMR clusters or HADOOP clusters) in different environments, as described elsewhere herein. The cluster management platform 220 may include a communication device and/or a computing device. For example, the cluster management platform 220 may include a server, such as an application server, a client server, a web server, a database server, a host server, a proxy server, a virtual server (e.g., executing on computing hardware), or a server in a cloud computing system. In some implementations, the cluster management platform 220 includes computing hardware used in a cloud computing environment, such as the cloud computing system 202. In some implementations, the cluster management platform 220 may be included in, or stored in, the cloud computing system 202.

The client device 230 includes one or more devices capable of receiving, generating, storing, processing, and/or providing information associated with establishing and/or monitoring computing node clusters (e.g., EMR clusters or HADOOP clusters) in different environments, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

A database 240 includes one or more devices capable of receiving, generating, storing, processing, and/or providing information associated with establishing and/or monitoring computing node clusters (e.g., EMR clusters or HADOOP clusters) in different environments, as described elsewhere herein. The database 240 may include a communication device and/or a computing device. For example, the database 240 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database 240 may communicate with one or more other devices of environment 200, as described elsewhere herein.

Network 250 includes one or more wired and/or wireless networks. For example, network 250 may include a cellular network, a public land mobile network (PLMN), a local area network (LAN), a wide area network (WAN), a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
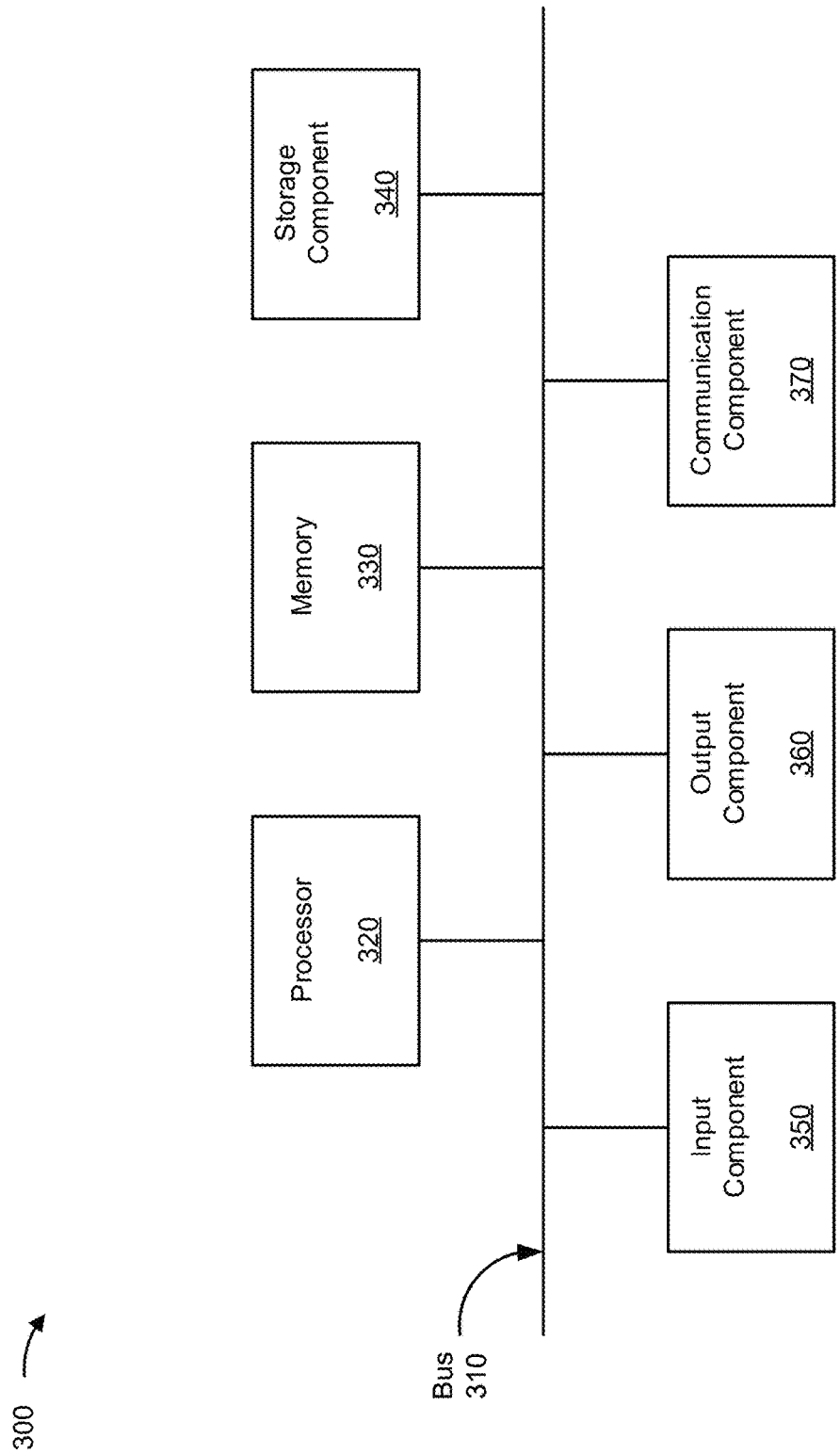
FIG. 3 is a diagram of example components of one or more devices of FIG. 2.

FIG. 3 is a diagram of example components of a device 300, which may correspond to the cloud service system 201, the cluster management platform 220, the client device 230, and/or the database 240. In some implementations, the cloud service system 201, the cluster management platform 220, the client device 230, and/or the database 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
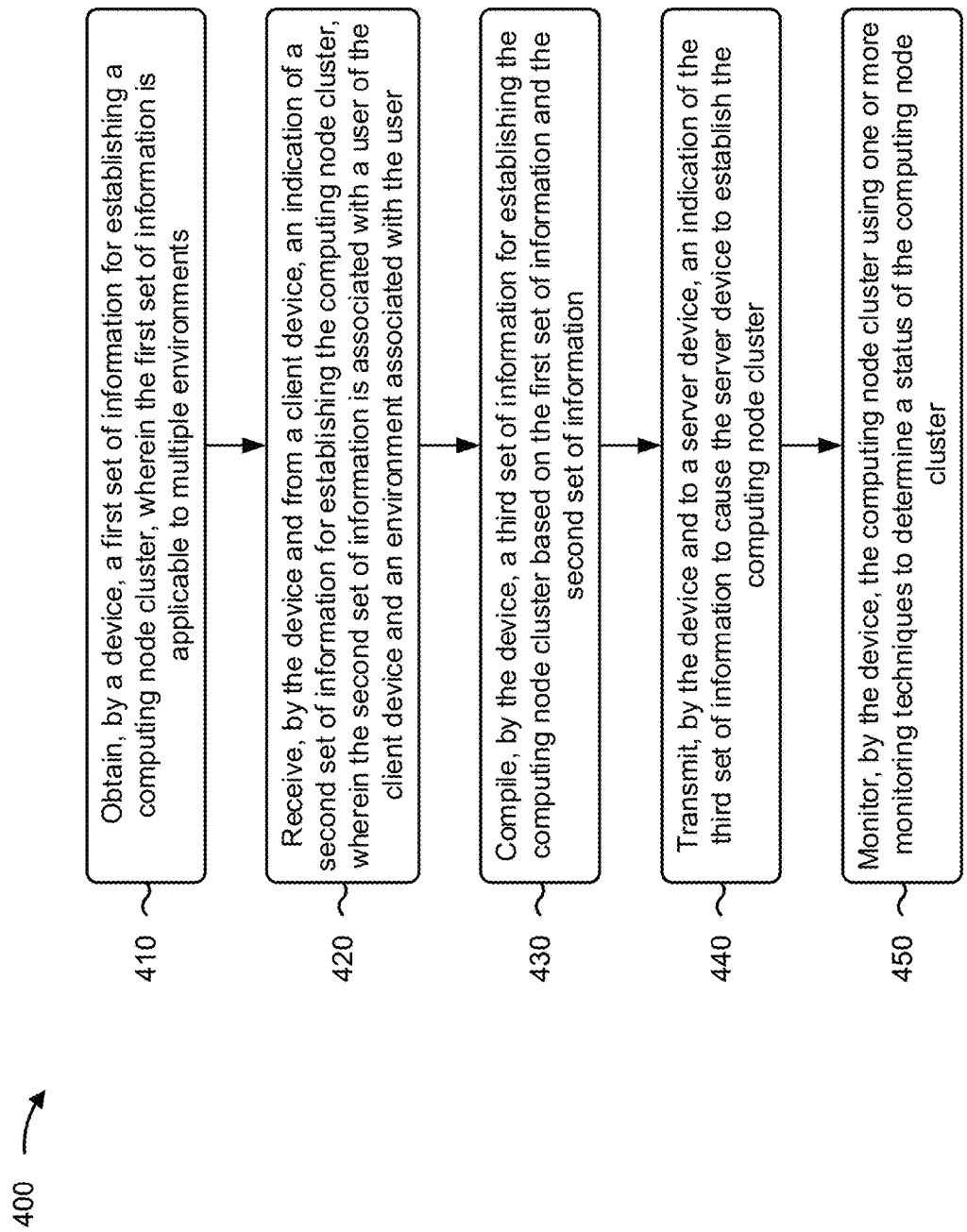
FIG. 4 is a flowchart of an example process relating to a platform for establishing computing node clusters in different environments.

FIG. 4 is a flowchart of an example process 400 associated with a platform for establishing computing node clusters. In some implementations, one or more process blocks of FIG. 4 may be performed by a device (e.g., cluster management platform 220). In some implementations, one or more process blocks of FIG. 4 may be performed by another device or a group of devices separate from or including the device, such as the cloud service system 201, the client device 230, and/or the database 240. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining a first set of information for establishing a computing node cluster (block 410). In some implementations, the first set of information is applicable to multiple environments. As further shown in FIG. 4, process 400 may include receiving, from a client device, an indication of a second set of information for establishing the computing node cluster (block 420). In some implementations, the second set of information is associated with a user of the client device and an environment associated with the user. As further shown in FIG. 4, process 400 may include compiling a third set of information for establishing the computing node cluster based on the first set of information and the second set of information (block 430). As further shown in FIG. 4, process 400 may include transmitting, to a server device, an indication of the third set of information to cause the server device to establish the computing node cluster (block 440). As further shown in FIG. 4, process 400 may include monitoring the computing node cluster using one or more monitoring techniques to determine a status of the computing node cluster (block 450).

In some implementations, monitoring the computing node cluster using the one or more monitoring techniques to determine the status of the computing node cluster includes establishing a cluster status monitoring event that monitors whether the EMR cluster has been successfully established or whether the EMR cluster has failed and/or establishing a run time monitor associated with the EMR cluster that monitors a use or computing activity level associated with the EMR cluster.

In some implementations, monitoring the computing node cluster using the one or more monitoring techniques to determine the status of the computing node cluster includes monitoring whether the computing node cluster has successfully established; determining that the computing node cluster has failed to establish; and automatically communicating with the server device to attempt to establish the computing node cluster based on determining that the computing node cluster has failed to establish. In some implementations, monitoring the computing node cluster using the one or more monitoring techniques to determine the status of the computing node cluster includes determining that the server device has established multiple computing node clusters that are based on the third set of information based on monitoring the computing node cluster; and communicating, with the server device, to cause a computing node cluster of the multiple computing node clusters to remain active and to terminate the remaining computing node clusters of the multiple computing node clusters.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing a common platform for establishing elastic MapReduce (EMR) clusters in different environments, the system comprising:
    one or more memories; and
    one or more processors, communicatively coupled to the one or more memories, configured to:
        obtain a specific configuration file that indicates one or more specific parameters for establishing an EMR cluster, wherein the EMR cluster is a cluster of virtual computing nodes in a cloud computing environment, and wherein the one or more specific parameters are provided by a client device and are associated with an environment in which the EMR cluster is to be applied;
        obtain a common configuration file that indicates one or more common parameters for establishing the EMR cluster, wherein the one or more common parameters are associated with multiple environments;
        communicate, with a cloud service system that provides the EMR cluster, a cluster configuration to establish the EMR cluster that is based on the specific configuration file and the common configuration file; and
        monitor the EMR cluster to determine at least one of whether the EMR cluster has been successfully established or run time information associated with the EMR cluster.

2. The system of claim 1, wherein the one or more specific parameters include at least one of:
    a security parameter,
    a production parameter,
    a cluster size parameter,
    a quality assurance parameter,
    a user identifier parameter, or
    a geographic location parameter.

3. The system of claim 1, wherein the one or more processors are further configured to:
    receive a step file indicating a set of steps to be performed by the EMR cluster; and
    transmit, to the cloud service system that provides the EMR cluster, the step file to cause the EMR cluster to perform the set of steps.

4. The system of claim 1, wherein the one or more processors, when communicating, with the cloud service system that provides the EMR cluster, the cluster configuration to establish the EMR cluster, are configured to:
    communicate, with the cloud service system that provides the EMR cluster, to periodically establish EMR clusters that are based on the specific configuration file and the common configuration file at a time indicated by the specific configuration file or the common configuration file.

5. The system of claim 1, wherein the one or more processors, when monitoring the EMR cluster, are configured to:
    establish a cluster status monitoring event that monitors whether the EMR cluster has been successfully established or whether the EMR cluster has failed.

6. The system of claim 5, wherein the one or more processors are further configured to:
    receive an indication that the EMR cluster has not been successfully established or that the EMR cluster has failed based on establishing the cluster status monitoring event; and
    perform an action based on receiving the indication, wherein the action includes at least one of:
        transmitting, to a client device associated with a user indicated by the specific configuration file, an indication that the EMR cluster has not been successfully established or that the EMR cluster has failed, or
        communicating, with the cloud service system that provides the EMR cluster, to retry to establish the EMR cluster based on the cluster configuration.

7. The system of claim 1, wherein the one or more processors, when monitoring the EMR cluster, are configured to:
    establish a run time monitor associated with the EMR cluster that monitors a use or computing activity level associated with the EMR cluster.

8. The system of claim 7, wherein the one or more processors are further configured to:
    receive an indication that the EMR cluster has been inactive for a threshold amount of time based on establishing the run time monitor; and
    perform an action based on receiving the indication, wherein the action includes at least one of:
        transmitting, to a client device associated with a user indicated by the specific configuration file, an indication that the EMR cluster has been inactive for the threshold amount of time, or
        communicating, with the cloud service system that provides the EMR cluster, to terminate the EMR cluster.

9. The system of claim 1, wherein the one or more processors, when monitoring the EMR cluster, are configured to:
    receive a step file indicating a set of steps to be performed by the EMR cluster, wherein the specific configuration file or the common configuration file indicates that EMR clusters are to be established according to a periodic schedule;
    determine that a step included in the set of steps has failed; and perform an action based on determining that the step has failed, wherein the action includes at least one of:
   transmitting, to a client device associated with a user indicated by the specific configuration file, an indication that the step has failed,
   causing the EMR cluster to retry to complete the step, or
   refraining from establishing a subsequent EMR cluster indicated by the periodic schedule.

10. A method of establishing computing node clusters in different environments, comprising:
   obtaining, by a device, a first set of information for establishing a computing node cluster, wherein the first set of information is applicable to multiple environments;
   receiving, by the device and from a client device, an indication of a second set of information for establishing the computing node cluster, wherein the second set of information is associated with a user of the client device and an environment associated with the user;
   compiling, by the device, a third set of information for establishing the computing node cluster based on the first set of information and the second set of information;
   transmitting, by the device and to a server device, an indication of the third set of information to cause the server device to establish the computing node cluster; and
   monitoring, by the device, the computing node cluster using one or more monitoring techniques to determine a status of the computing node cluster.

11. The method of claim 10, further comprising:
   receiving, from a second client device, an indication of a fourth set of information for establishing the computing node cluster, wherein the fourth set of information is associated with a second user of the second client device and an environment associated with the second user;
   compiling a fifth set of information based on the first set of information and the fourth set of information; and
   transmitting, to the server device, an indication of the fifth set of information to cause the server device to establish a second computing node cluster.

12. The method of claim 10, wherein monitoring the computing node cluster using the one or more monitoring techniques to determine the status of the computing node cluster comprises:
   monitoring whether the computing node cluster has successfully established;
   determining that the computing node cluster has failed to establish; and
   automatically communicating with the server device to attempt to establish the computing node cluster based on determining that the computing node cluster has failed to establish.

13. The method of claim 10, wherein monitoring the computing node cluster using the one or more monitoring techniques to determine the status of the computing node cluster comprises:
   determining that the server device has established multiple computing node clusters that are based on the third set of information based on monitoring the computing node cluster; and
   communicating, with the server device, to cause a computing node cluster of the multiple computing node clusters to remain active and to terminate the remaining computing node clusters of the multiple computing node clusters.

14. The method of claim 10, wherein monitoring the computing node cluster using the one or more monitoring techniques to determine the status of the computing node cluster comprises:
   determining that the computing node cluster has failed based on monitoring the computing node cluster; and
   preventing a second computing node cluster from being established based on determining that the computing node cluster has failed, wherein the second computing node cluster is to be established subsequent to the computing node cluster and to be established using the third set of information.

15. The method of claim 14, wherein determining that the computing node cluster has failed comprises at least one of:
   determining that a task that is to be completed using the computing node cluster has not successfully completed; and
   determining that the second set of information indicates that the task should be completed prior to establishing a subsequent computing node cluster.

16. The method of claim 10, wherein receiving the indication of the second set of information for establishing the computing node cluster comprises:
   receiving the indication of the second set of information via an application programming interface (API) call, via a command-line interface command, or via a command to initiate an anonymous function.

17. A non-transitory computer-readable medium storing a set of instructions, the set of instructions comprising:
   one or more instructions that, when executed by one or more processors of a device, cause the device to:
   obtain a first configuration file for establishing a node cluster, wherein the first configuration file indicates one or more common parameters that are applicable to multiple environments;
   receive an indication of a second configuration file for establishing the node cluster, wherein the second configuration file indicates one or more specific parameters that are associated with an environment that is to be associated with the node cluster;
   generate a third configuration file for establishing the node cluster based on the first configuration and the second configuration file;
   transmit, to a cloud based server device, an indication of the third configuration file to cause the cloud based server device to establish the node cluster;
   monitor the node cluster using one or more monitoring techniques to determine a status of the node cluster; and
   perform an action if the status of the node cluster indicates a failure, wherein the action includes at least one of:
      transmitting, to a client device indicated by the second configuration file, an indication of the failure, or
      communicating, with the cloud based server device, to resolve the failure.

18. The non-transitory computer-readable medium of claim 17, wherein the one or more instructions, that cause the device to perform the action if the status of the node cluster indicates a failure, further cause the device to:
   identify a second node cluster that is to be established using the third configuration file subsequent to the node cluster; and
   refrain from causing the second node cluster to be established based on the status of the node cluster indicating the failure.

19. The non-transitory computer-readable medium of claim 17, wherein the one or more instructions, that cause the device to monitor the node cluster using the one or more monitoring techniques to determine the status of the node cluster, cause the device to:
    detect a failure associated with the node cluster based on determining that at least one of:
      the node cluster has failed to establish,
      the node cluster has failed after being established,
      multiple node clusters have been established,
      a task or step to be performed by the node cluster has failed, or
      the node cluster has been inactive for a threshold amount of time.

20. The non-transitory computer-readable medium of claim 17, wherein the node cluster is an elastic MapReduce (EMR) cluster.

\* \* \* \* \*